United States Patent
Volny et al.

(10) Patent No.: US 11,440,667 B2
(45) Date of Patent: Sep. 13, 2022

(54) SHOCK ABSORBING EVACUATION SYSTEMS AND METHODS

(71) Applicant: Goodrich Corporation, Charlotte, NC (US)

(72) Inventors: Jaro S Volny, Scottsdale, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 510 days.

(21) Appl. No.: 16/657,951

(22) Filed: Oct. 18, 2019

(65) Prior Publication Data

US 2020/0047893 A1   Feb. 13, 2020

Related U.S. Application Data

(62) Division of application No. 15/407,818, filed on Jan. 17, 2017, now Pat. No. 10,486,818.

(51) Int. Cl.
   *B64D 25/14*   (2006.01)
   *B64D 25/08*   (2006.01)
   *A62B 1/20*   (2006.01)

(52) U.S. Cl.
   CPC ............... *B64D 25/14* (2013.01); *A62B 1/20* (2013.01); *B64D 25/08* (2013.01)

(58) Field of Classification Search
   CPC .................................. B64D 25/14; A62B 1/20
   USPC ............................................. 244/138 R, 905
   See application file for complete search history.

(56) References Cited

U.S. PATENT DOCUMENTS

| | | |
|---|---|---|
| 3,391,771 A | 7/1968 | Day |
| 3,554,344 A | 1/1971 | Summer |
| 3,606,939 A | 9/1971 | Summer |
| 3,669,217 A | 6/1972 | Fisher |
| 3,793,498 A | 2/1974 | Matsui et al. |
| 3,897,861 A | 8/1975 | Miller et al. |
| 3,944,023 A | 3/1976 | Fisher |
| 4,089,545 A | 5/1978 | Ferry |
| 4,460,062 A | 7/1984 | Fisher |
| 4,526,262 A | 7/1985 | Malcolm |
| 4,567,977 A | 2/1986 | Fisher |
| 4,850,295 A | 7/1989 | Weaver |
| 5,195,217 A | 3/1993 | Arntzen |
| 5,466,082 A | 11/1995 | Sherar |
| 5,711,495 A | 1/1998 | Danielson |

(Continued)

FOREIGN PATENT DOCUMENTS

| | | |
|---|---|---|
| EP | 0110206 | 6/1984 |
| EP | 0163925 | 12/1985 |

(Continued)

OTHER PUBLICATIONS

Jaro Volny et al., U.S. Appl. No. 15/407,818, filed Jan. 17, 2017 and entitled Shock Absorbing Evacuation System Restraint.

(Continued)

*Primary Examiner* — Christopher P Ellis
(74) *Attorney, Agent, or Firm* — Snell & Wilmer L.L.P.

(57) ABSTRACT

A method for deploying an inflatable slide includes increasing pressure within the inflatable slide, increasing a load in a force releasing member and a dampener, both of which are attached to the inflatable slide, in response to the increasing pressure within the evacuation slide, the load being increased at a slower rate than would occur if the dampener were not present, separating the force releasing member, and inflating the inflatable slide.

5 Claims, 6 Drawing Sheets

(56) References Cited

U.S. PATENT DOCUMENTS

| | | | |
|---|---|---|---|
| 5,871,180 | A | 2/1999 | Hublikar |
| 6,196,033 | B1 | 3/2001 | Dowdle |
| 6,814,183 | B2 | 11/2004 | Horvath et al. |
| 8,066,108 | B2 | 11/2011 | Hentges |
| 9,296,484 | B2 | 3/2016 | Biro |
| D753,885 | S | 4/2016 | Hill |
| 10,189,573 | B2 | 1/2019 | Haynes |
| 2002/0175024 | A1 | 11/2002 | Kurtgis |
| 2004/0094361 | A1 | 5/2004 | Gronlund et al. |
| 2012/0090521 | A1 | 4/2012 | Zablocki |
| 2013/0200217 | A1 | 8/2013 | Biro |
| 2013/0256159 | A1 | 10/2013 | Walsh |
| 2014/0224937 | A1 | 8/2014 | Brown |
| 2015/0097083 | A1 | 4/2015 | Fellmann |
| 2016/0010775 | A1 | 1/2016 | Morroney |
| 2016/0107755 | A1 | 4/2016 | Latecoere |
| 2016/0367845 | A1 | 12/2016 | Bouquier |
| 2018/0170559 | A1 | 6/2018 | Haynes |
| 2018/0201379 | A1 | 7/2018 | Bahena |
| 2018/0201381 | A1 | 7/2018 | Volny |
| 2018/0273189 | A1 | 9/2018 | Haynes |
| 2018/0273192 | A1 | 9/2018 | Haynes |
| 2018/0312265 | A1 | 11/2018 | Haynes |
| 2018/0334256 | A1 | 11/2018 | Haynes |

FOREIGN PATENT DOCUMENTS

| | | |
|---|---|---|
| EP | 0260354 | 3/1988 |
| EP | 3348482 | 7/2018 |

OTHER PUBLICATIONS

European Patent Office, European Office Action dated Apr. 3, 2019 in Application No. 18150827.6.
USPTO, Final Office Action dated Apr. 22, 2018 in U.S. Appl. No. 15/407,852.
USPTO, Pre-Interview First Office Action dated Jun. 19, 2019 in U.S. Appl. No. 15/405,854.
USPTO, Supplemental Notice of Allowance, dated Sep. 20, 2019 in U.S. Appl. No. 15/407,818.
European Patent Office, European Office Action dated Jun. 2, 2021 in Application No. 18150447.3.
National Institute of Industrial Property, Brazilian Office Action dated Oct. 16, 2021 in Application No. BR102017023938-1.
National Institute of Industrial Property, Brazilian Office Action dated Nov. 4, 2021 in Application No. BR102017023489-4.
National Institute of Industrial Property, Brazilian Office Action dated Oct. 19, 2021 in Application No. BR102017024349-4.
European Patent Office, European Office Action dated Feb. 17, 2020 in European Application No. 18150447.3.
USPTO, Notice of Allowance dated Mar. 11, 2020 in U.S. Appl. No. 15/405,835.
European Patent Office, European Office Action dated Jul. 27, 2020 in Application No. 18150827.6.
European Patent Office, European Office Action dated Sep. 10, 2020 in Application No. 18150447.3.
Haynes et al., U.S. Appl. No. 15/405,854, filed Jan. 13, 2017 entitled "Lightweight Restraint for Evacuation Slide Systems".
Bahena et al., U.S. Appl. No. 15/405,835, filed Jan. 13, 2017 entitled "Secondary Release Arrangement for Evacuation Slide Systems".
Volny et al., U.S. Appl. No. 15/407,852, filed Jan. 17, 2017 entitled "Continuously Restrained Evacuation System".
Extended European Search Report dated Feb. 7, 2018 in European Application No. 18150447.3.
Extended European Search Report dated Feb. 22, 2018 in European Application No. 18151883.8.
European Patent Office, European Search Report dated Mar. 27, 2018 in Application No. 18150827.6-1010.
European Patent Office, European Search Report dated Mar. 2, 2018 in EP Application 18150481.2.
USPTO, Pre-Interview First Office Action dated Apr. 3, 2018 in U.S. Appl. No. 15/407,852.
USPTO, First Action Interview Office Action dated Jul. 10, 2018 in U.S. Appl. No. 15/407,852.
USPTO, Notice of Allowance dated Jun. 4, 2019 in U.S. Appl. No. 15/407,852.
USPTO, Pre-Interview First Office Action dated Jul. 3, 2019 in U.S. Appl. No. 15/405,835.
European Patent Office, European Office Action dated May 7, 2019 in European Application No. 18150447.3.
European Patent Office, European Office Action dated May 16, 2019 in Application No. 18151883.8.
USPTO, Requirement for Restriction dated Jan. 30, 2019 in U.S. Appl. No. 15/407,818.
USPTO, Non Final Office Action datec Apr. 12, 2019 in U.S. Appl. No. 15/407,818.
USPTO, Notice of Allowance dated Aug. 1, 2019 in U.S. Appl. No. 15/407,818.
USPTO, Notice of Allowance dated Sep. 20, 2019 in U.S. Appl. No. 15/407,818.
USPTO, Notice of Allowance dated Oct. 21, 2019 in U.S. Appl. No. 15/405,854.
USPTO, Non-Final Office Action dated Nov. 18, 2019 in U.S. Appl. No. 15/405,835.
European Patent Office, European Office Action dated Dec. 9, 2019 in Application No. 18150827.6.

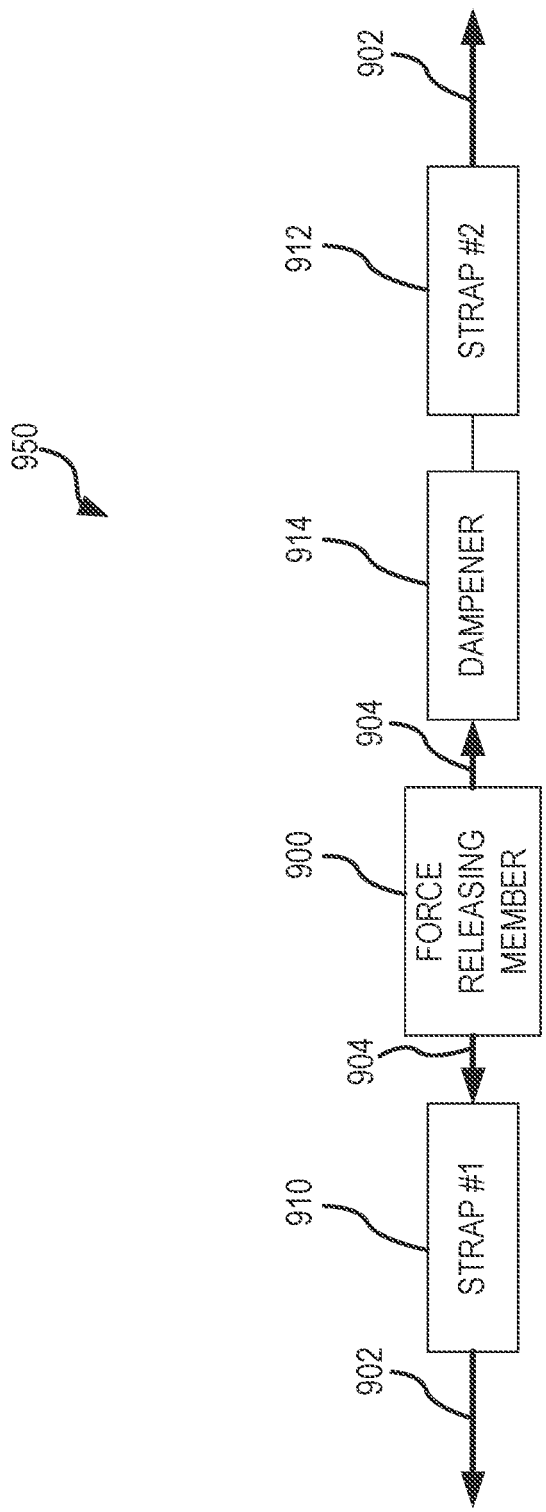

SHOCK ABSORBING EVACUATION SYSTEMS AND METHODS

CROSS REFERENCE TO RELATED APPLICATIONS

This application is a divisional of, and claims priority to, and the benefit of U.S. patent application Ser. No. 15/407,818, filed on Jan. 17, 2017, and entitled "SHOCK ABSORBING EVACUATION SYSTEM RESTRAINT" which is incorporated by reference herein in its entirety.

FIELD

The present disclosure relates to inflatable evacuation systems and, in particular, to restraint systems and methods for inflatable slides.

BACKGROUND

Emergency inflatable slides may be used to exit an aircraft absent a jet way or other suitable means of egress for passengers. The slides may deploy from a door sill or a side of the aircraft fuselage, for example. The slide deployment is controlled by restraints placed throughout the length of the slide which release in stages in response to internal slide pressure.

SUMMARY

A restraint arrangement for an inflatable slide is disclosed, in accordance with various embodiments. A restraint arrangement for an inflatable slide may comprise a force releasing member attached to the inflatable slide at least two locations, and a dampener in operable communication with the force releasing member such that a rate of force applied to the force releasing member is reduced compared to if the dampener was not present.

In various embodiments, the force applied to the force releasing member may be due to a pressure increase that causes the inflatable slide to inflate. The dampener may be a dashpot. The dampener may be a shock absorber. The dampener may comprise an elastic strap. The force releasing member and the dampener may be the same device. The force releasing member may be configured to separate in response to the pressure increase. The force releasing member may be configured to separate in response to a predetermined pressure.

A restraint arrangement for an evacuation system is disclosed, in accordance with various embodiments. A restraint arrangement for an evacuation system may comprise a restraint, a first strap coupled between the restraint and the evacuation system, and a second strap coupled between the restraint and the evacuation system, wherein the restraint is configured to separate in response to a tensile force applied to the first strap, the second strap, and the restraint.

In various embodiments, the second strap may comprise an elastic material, the second strap configured to stretch to dampen a load through the restraint. The restraint may be configured to separate in response to the load. At least one of the first strap and the second strap may comprise a nylon webbing. The restraint arrangement may further comprise a dampener coupled in series with the restraint configured to dampen a load through the restraint. The dampener may comprise a dampener body and a plunger configured to translate within the dampener body. The restraint may comprise a dampener body coupled to the second strap, a plunger coupled to the first strap, a spring member, and a shear pin. The plunger may be configured to extend from the dampener body in response to an internal pressure of the evacuation system. The shear pin may be configured to break in response to the internal pressure of the evacuation system being greater than a threshold value. The evacuation system may be configured to unfold in response to the restraint separating.

A method for deploying an inflatable slide is disclosed, in accordance with various embodiments. A method for deploying an inflatable slide may comprise increasing pressure within the inflatable slide, increasing a same load in a force releasing member and a dampener, both of which are attached to the inflatable slide, in response to the increasing pressure within the evacuation slide, the same load being increased at a slower rate than would occur if the dampener were not present, separating the force releasing member, and inflating the inflatable slide.

In various embodiments, the method may further comprise stretching, by the dampener, in response to the same load.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 9 illustrates a restraint arrangement receiving a load and generating a dampened load, in accordance with various embodiments.

DETAILED DESCRIPTION

The detailed description of exemplary embodiments herein makes reference to the accompanying drawings, which show exemplary embodiments by way of illustration.

While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface in a fully deployed position. During deployment, a plurality of force releasing members may aid in controlling the inflation process of the slide. The force releasing members may be configured to restrain a slide in a folded position and to de-couple in response to internal slide pressure. A restraint arrangement is provided to absorb loads applied to a force releasing member. Restraint arrangements of the present disclosure may prevent premature separation of the force releasing members.

Figure 1:
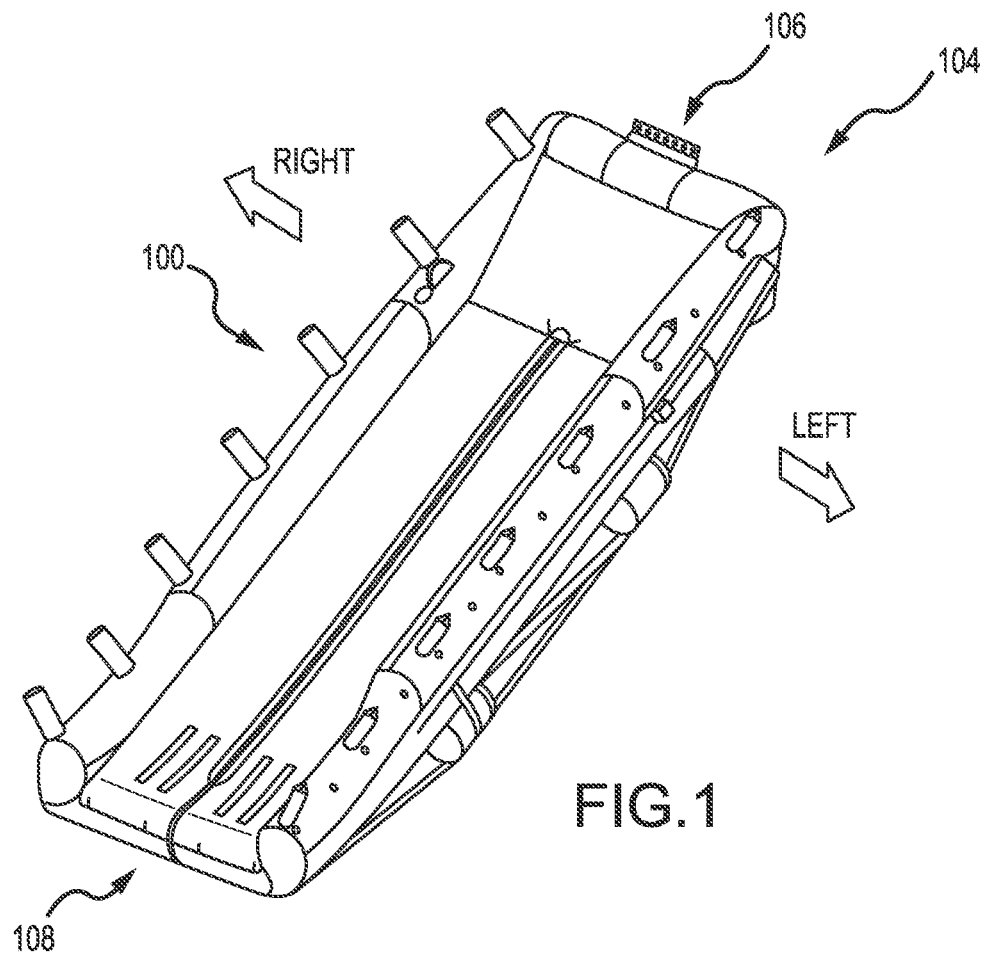
FIG. 1 illustrates a perspective view of an inflatable slide in a deployed position, in accordance with various embodiments.
Figure 2:
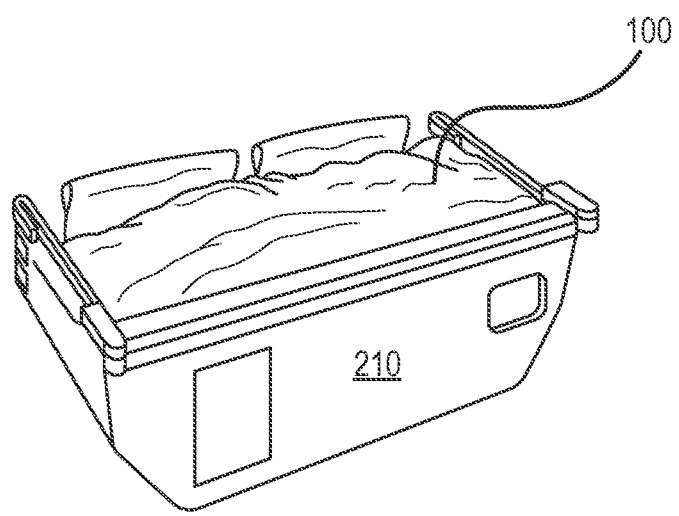
FIG. 2 illustrates a perspective view of the inflatable slide in a stowed position, in accordance with various embodiments.
Figure 3:
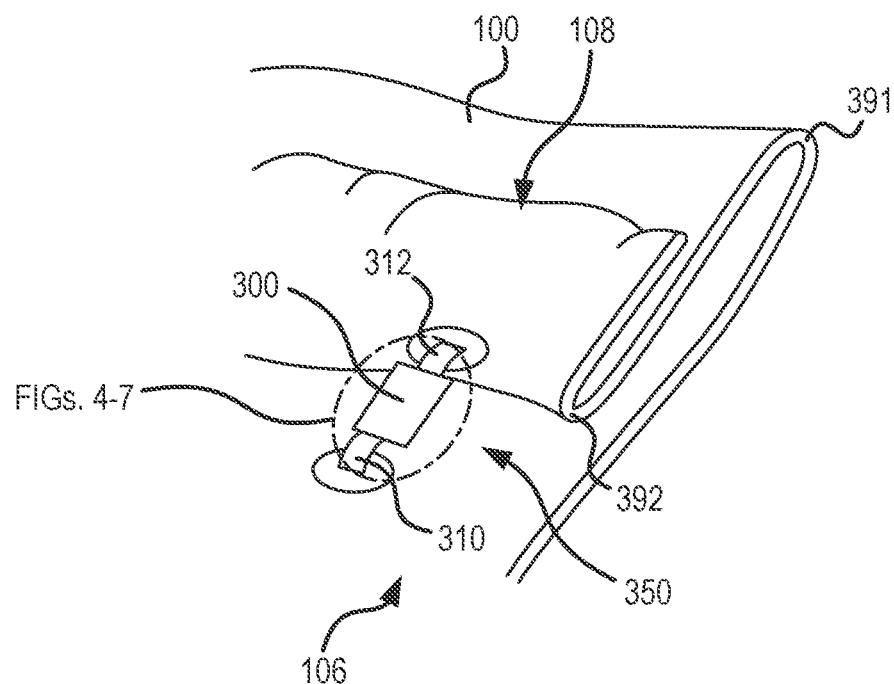
FIG. 3 illustrate a restraint arrangement aiding in retaining the inflatable slide in a folded position, in accordance with various embodiments.

With respect to FIG. 2 through FIG. 7C, elements with like element numbering, as depicted in FIG. 1, are intended to be the same and will not necessarily be repeated for the sake of clarity. With respect to FIG. 4 through FIG. 7C, elements with like element numbering, as depicted in FIG. 3, are intended to be the same and will not necessarily be repeated for the sake of clarity.

With reference to FIG. 1, an evacuation system 104 is illustrated, in accordance with various embodiments. Evacuation system 104 may comprise inflatable slide 100. Inflatable slide 100 may comprise a head end 106 and a toe end 108. Head end 106 may be coupled to aircraft structure. Inflatable slide 100 may comprise an inflatable slide. FIG. 1 illustrates inflatable slide 100 in an inflated and/or deployed position. Inflatable slide 100 may comprise a dual lane slide. However, inflatable slide 100 may comprise any number of lanes. Toe end 108 may contact an exit surface in response to inflatable slide 100 being deployed.

With reference to FIG. 2, inflatable slide 100 is illustrated in a stowed and/or packed position. In this regard, inflatable slide 100 may be stowed in a packboard 210. In various embodiments, inflatable slide 100 may be folded in the stowed position. In various embodiments, inflatable slide 100 may be deployed from packboard 210 in response to opening an emergency exit door. Packboard 210 may be coupled to an aircraft in an installed position. Typically, a packboard 210 includes a blow-out panel which opens in response to deployment of inflatable slide 100 through which opening the inflatable may exit the packboard. In this regard, inflatable slide 100 may be configured to be deployed from an aircraft.

With reference to FIG. 3, inflatable slide 100 is illustrated in a folded position, in accordance with various embodiments. For example, inflatable slide 100 may include a plurality of folds, including first fold 391 and second fold 392, when inflatable slide 100 is in the folded or stowed position. A restraint arrangement 350 may aid in maintaining first fold 391 and/or second fold 392. Restraint arrangement 350 may aid in staged deployment of inflatable slide 100. Restraint arrangement 350 may comprise a force releasing member 300, a first strap 310, and a second strap 312. Force releasing member 300 may be attached to inflatable slide 100 at least two locations. Force releasing member 300 may be coupled to inflatable slide 100 via first strap 310. Force releasing member 300 may be coupled to inflatable slide 100 via second strap 312. Inflatable slide 100 may unfold in response to force releasing member 300 separating.

In various embodiments, force releasing member 300 may be configured to separate in response to an internal pressure in inflatable slide 100. For example, a gas cylinder may supply a flow of pressurized fluid to inflatable slide 100 in response to inflatable slide 100 being deployed. Inflatable slide 100 may begin to inflate and an internal pressure of inflatable slide 100 may increase. Force releasing member 300 may maintain inflatable slide 100 in a folded position until the internal pressure has increased above a predetermined threshold value. Inflatable slide 100 may unfold in response to force releasing member 300 separating. In this regard, inflatable slide 100 may fully deploy in response to force releasing member 300 separating.

In various embodiments, first strap 310 and/or second strap 312 may comprise a rope, tape, ribbon, webbing, or any other suitable strap. In various embodiments, first strap 310 and/or second strap 312 may comprise nylon, ballistic nylon, polypropylene, polyester, cotton, or any other suitable material. For example, first strap 310 and second strap 312 may comprise a nylon webbing.

In various embodiments, force releasing member 300 may separate, decoupling first strap 310 from second strap 312, in response to a predetermined force, such as tensile force. Said tensile force may be generated in response to an internal pressure of the inflatable slide 100, for example during inflation. In various embodiments, force releasing member 300 may be configured to separate in response to a tensile force of between 150 pounds and 700 pounds (667 N-3114 N), and in various embodiments in response to a tensile force of between 170 pounds and 600 pounds (756 N-2669 N), and in various embodiments, in response to a tensile force of between 170 pounds and 300 pounds (756 N-1334 N).

Figure 4:
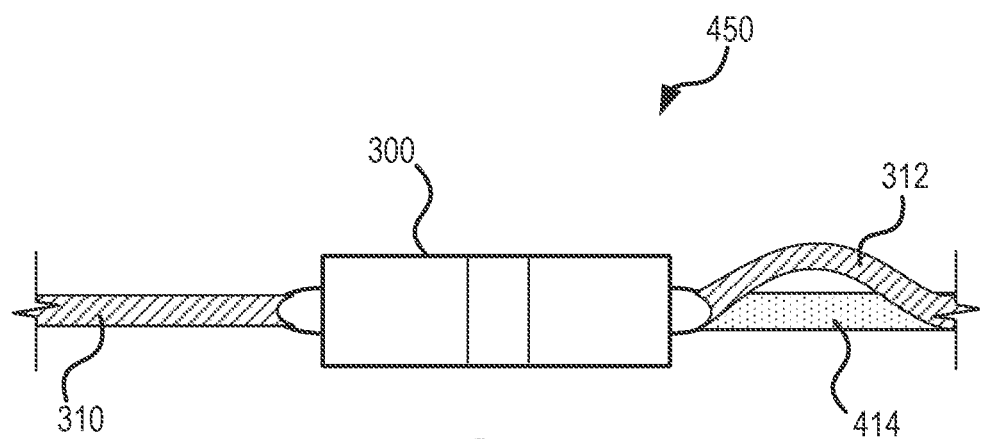
FIGS. 4, 5, and 6 illustrate restraint arrangements, in accordance with various embodiments.

With reference to FIG. 4, a restraint arrangement 450 is illustrated, in accordance with various embodiments. In various embodiments, restraint arrangement 450 may be similar to restraint arrangement 350, with momentary reference to FIG. 3. Restraint arrangement 450 may further comprise a third strap (also referred to herein as a dampener) 414. Third strap 414 may be coupled in parallel with second strap 312. In various embodiments, third strap 414 may comprise an elastic material. Third strap 414 may comprise an elastomer. Third strap 414 may comprise a shock absorber. Third strap 414 may be in operable communication with force releasing member 300 such that a rate of the tensile force applied to the force releasing member 300 is reduced compared to if the third strap 414 was not present. In this regard, third strap 414 may be configured to stretch in response to a tensile force being applied to third strap 414. For example, a tensile force may be applied to third strap 414 in response to inflatable slide 100 being deployed and/or inflated, with momentary reference to FIG. 3. Said tensile force may be transferred from third strap 414 to second strap 312 in response to third strap 414 being stretched. Said tensile force may be dampened in response to the stretching. For example, second strap 312 may comprise a length which is greater than the length of third strap 414 in an unstretched position. Third strap 414 may move to a stretched position and increase in length until it is as long as second strap 312. In response to third strap 414 stretching to a length equal to second strap 312, the tensile force, or load, may be transferred from third strap 414 to second strap 312.

Figure 5:
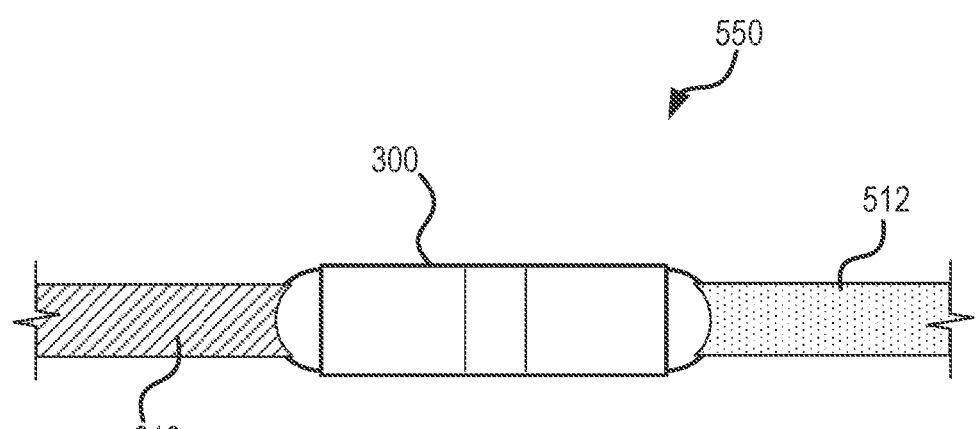

With reference to FIG. 5, a restraint arrangement 550 is illustrated, in accordance with various embodiments. In various embodiments, restraint arrangement 550 may be similar to restraint arrangement 350, with momentary reference to FIG. 3. Restraint arrangement 550 may include a second strap (also referred to herein as a dampener) 512. Second strap 512 may comprise an elastic material. Second strap 512 may comprise a shock absorber. Second strap 512 may be configured to stretch in response to a tensile force being applied to restraint arrangement 550, for example, in response to an internal pressure in inflatable slide 100, with momentary reference to FIG. 3. Second strap 512 may be rated for loads greater than the rating of force releasing member 300. Stated differently, force releasing member 300 may be configured to separate at a load which is less than the rated load of second strap 512. Stated yet another way, second strap 512 may be configured to stretch without breaking before force releasing member 300 is separated.

Figure 6:
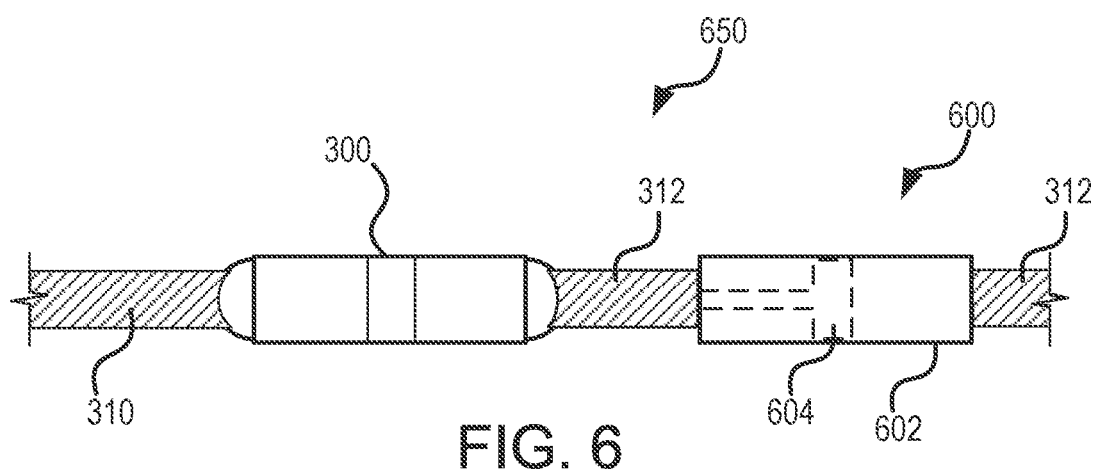

With reference to FIG. 6, a restraint arrangement 650 is illustrated, in accordance with various embodiments. In various embodiments, restraint arrangement 650 may be similar to restraint arrangement 350, with momentary reference to FIG. 3. Restraint arrangement 650 may include a dampener 600 coupled in line with second strap 312. In this regard, dampener 600 may be coupled in series with force releasing member 300. Dampener 600 may dampen tensile forces through force releasing member 300. Dampener 600 may be in operable communication with force releasing member 300 such that a rate of the tensile force applied to the force releasing member 300 is reduced compared to if the dampener 600 was not present. Dampener 600 may be a dashpot. Dampener 600 may comprise a shock absorber. Dampener 600 may include a dampener body 602. Dampener 600 may include a plunger 604. Plunger 604 may translate within dampener body 602.

Figure 7A:
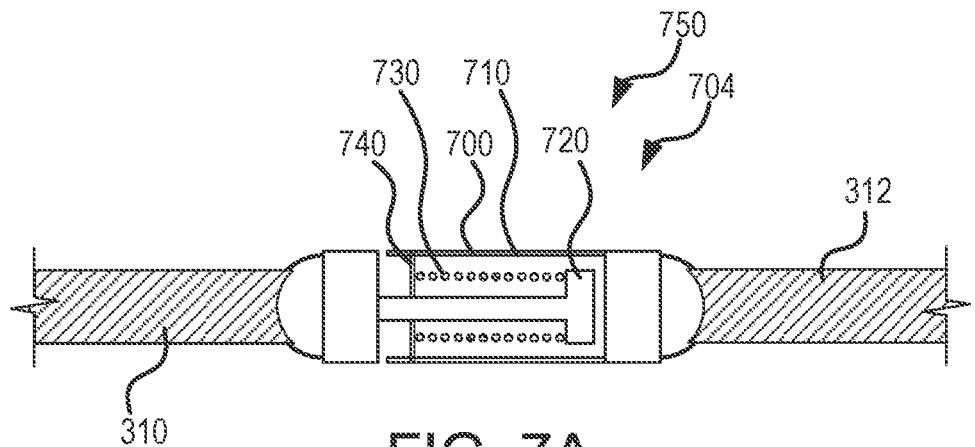
FIGS. 7A, 7B, and 7C illustrate a restraint arrangement with a force releasing member in a relaxed position, under a load in a fully stretched position, and in a separated position, respectively, in accordance with various embodiments.
Figure 7B:
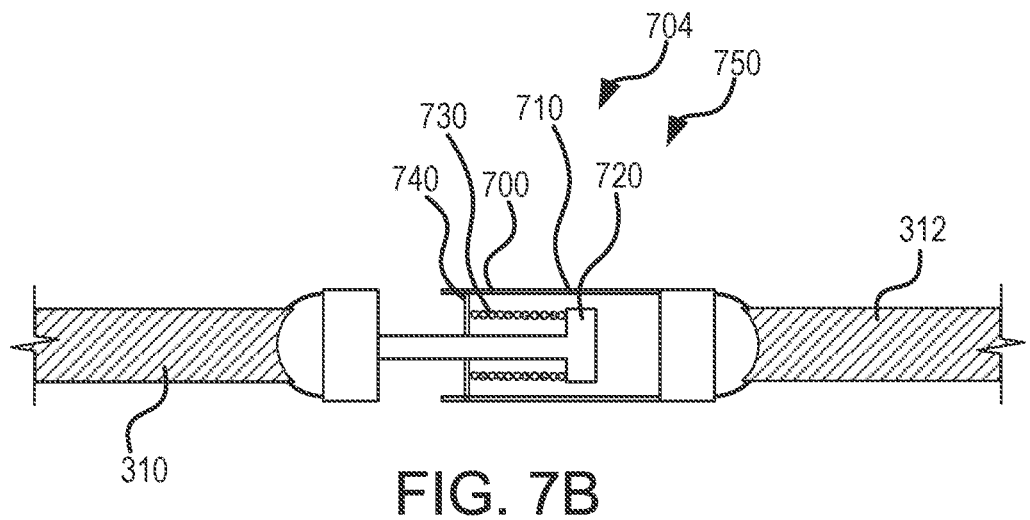
Figure 7C:
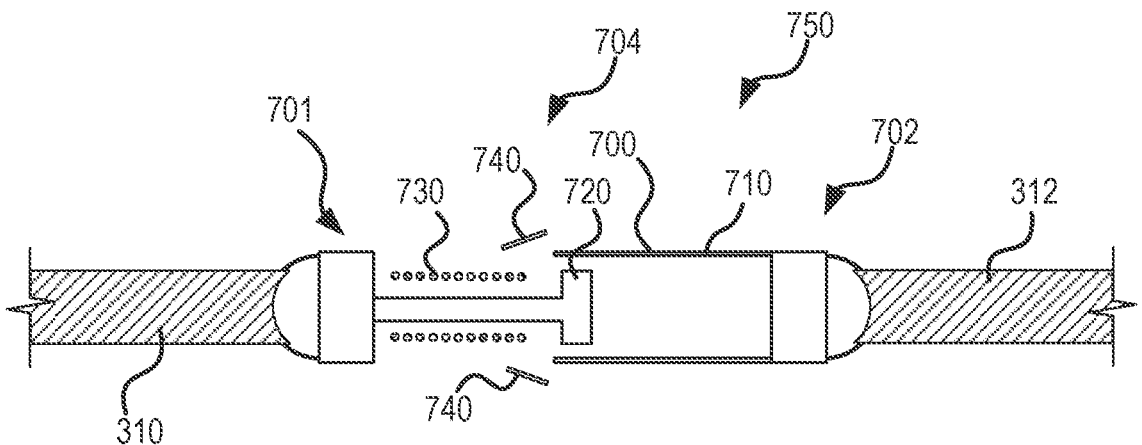

With reference to FIG. 7A through FIG. 7C a restraint arrangement 750 is illustrated, in accordance with various embodiments. In various embodiments, restraint arrangement 750 may be similar to restraint arrangement 350, with momentary reference to FIG. 3. Restraint arrangement 750 may include a force releasing member 700. Force releasing member 700 may include a dampener 704 comprising a dampener body 710, a plunger 720, and a spring member 730. In this regard, force releasing member 700 and dampener 704 may be the same device. Force releasing member 700 may include shear pin 740. Shear pin 740 may be coupled to dampener body 710. Spring member 730 may be coupled between plunger 720 and shear pin 740. In the illustrated embodiment, spring member 730 is a compression spring compression spring comprising a coil spring. However, it is contemplated herein that spring member 730 may be arranged as any type of spring, including a torsion spring, a clock spring, and/or a tension spring. Plunger 720 may be coupled to first strap 310. Dampener body 710 may be coupled to second strap 312.

As illustrated in FIG. 7B, dampener body 710 may be pulled away from plunger 720 in response to internal pressure of an inflatable slide, with momentary reference to FIG. 3. Spring member 730 may compress in response to internal pressure of an inflatable slide, with momentary reference to FIG. 3. Dampener 704 may be in operable communication with force releasing member 700 such that a rate of a tensile force applied to the force releasing member 700 is reduced compared to if the dampener 704 was not present.

As illustrated in FIG. 7C, shear pin 740 may break in response to the tensile force being applied through force releasing member 700 via first strap 310 and second strap 312. In this regard, force releasing member 700 may separate into at least a first portion 701 and a second portion 702 decoupling first strap 310 from second strap 312 and allowing inflatable slide 100 to fully inflate and deploy, with momentary reference to FIG. 3.

In various embodiments, dampener body 710, plunger 720, spring member 730, and/or shear pin 740 may comprise metal.

With reference to FIG. 9, a restraint arrangement 950 is illustrated, in accordance with various embodiments. Restraint arrangement 950 may include first strap 910, force releasing member 900, dampener 914, and second strap 912. In various embodiments, and with momentary additional reference to FIG. 3 through FIG. 7A, restraint arrangement 950 may be similar to restraint arrangement 350, restraint arrangement 450, restraint arrangement 550, restraint arrangement 650, and/or restraint arrangement 750. In this regard, dampener 914 may comprise third strap 414. Further, the combination of dampener 914 and second strap 912 may comprise second strap 512. Still further, the combination of force releasing member 900 and dampener 914 may comprise force releasing member 700. In this regard, although illustrated as being in series, dampener 914 and second strap 912 may be in parallel, and force releasing member 900 and dampener 914 may be in parallel.

A tensile force (also referred to herein as a load) 902 may be applied to restraint arrangement 950. Tensile force 902 may be applied across first strap 910, force releasing member 900, dampener 914, and second strap 912. Tensile force 902 may be in response to inflation of inflatable slide 100. Tensile force 902 may be in response to an internal pressure of inflatable slide 100. Stated differently, tensile force 902 may be applied to force releasing member 900 in response to a pressure increase of inflatable slide 100 that causes the inflatable slide to inflate. Dampener 914 may dampen tensile force 902 to generate a dampened tensile force (also referred to herein as a dampened load) 904. In this regard, force releasing member 900 may receive dampened tensile force 904.

Figure 8:
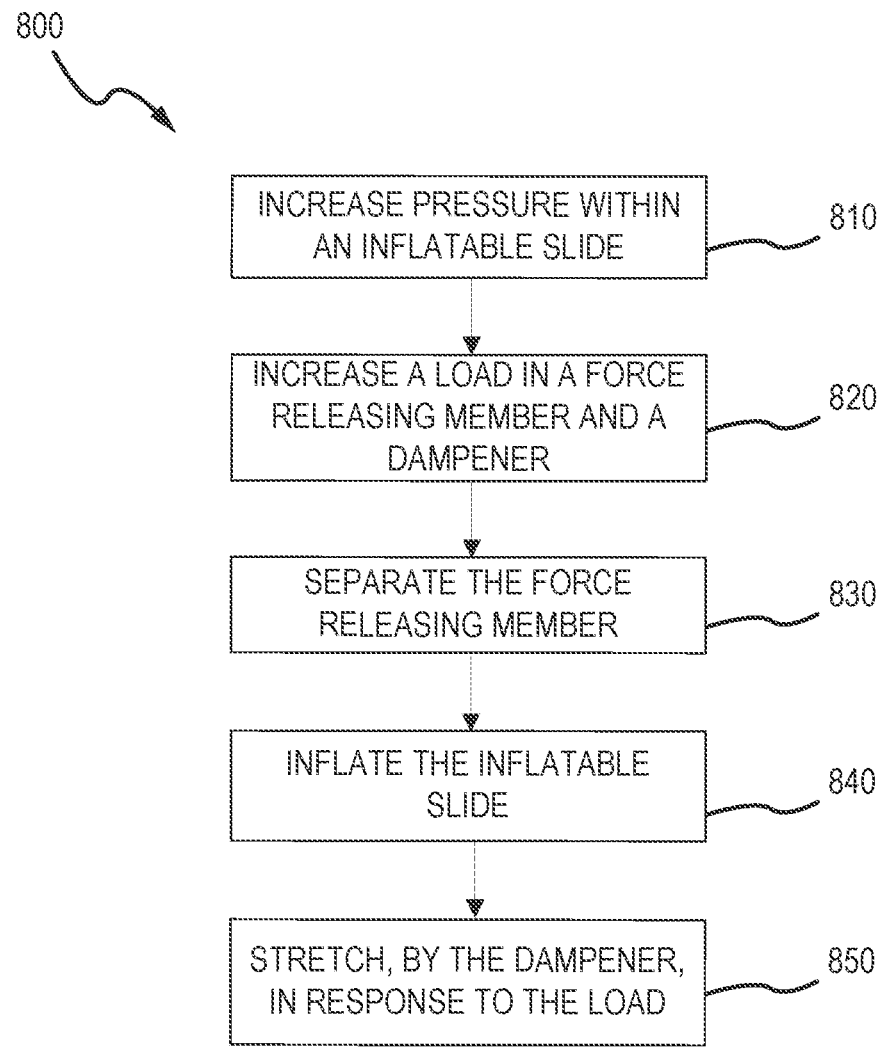
FIG. 8 illustrates a method for deploying an inflatable slide, in accordance with various embodiments.

With reference to FIG. 8, a method 800 for deploying an inflatable slide is provided, in accordance with various embodiments. Method 800 includes increasing pressure within an inflatable slide (step 810). Method 800 includes increasing a load in a force releasing member and a dampener (step 820). Method 800 includes separating the force releasing member (step 830). Method 800 includes inflating the evacuation slide (step 840). Method 800 may include stretching, by the dampener, in response to the load (step 850).

In various embodiments, with combined reference to FIG. 4, FIG. 5, FIG. 6, FIG. 7A, FIG. 8, and FIG. 9, step 810 may include increasing a pressure within inflatable slide 100. Step 820 may include increasing a same load (e.g., tensile force 902) in a force releasing member (e.g., force releasing member 300, and/or force releasing member 700) and a dampener (e.g., third strap 414, second strap 512, dampener 600, and/or force releasing member 700), both of which are attached to the evacuation slide 100, in response to the increasing pressure within the evacuation slide 100, the same load being increased at a slower rate than would occur if the dampener were not present. Step 830 may include separating the force releasing member (e.g., force releasing member 300, and/or force releasing member 700). Step 840 may include inflating inflatable slide 100. Inflatable slide 100 may be inflated via a compressed tank for example. Step 850 may include stretching, by the dampener (e.g., third strap 414, second strap 512, and/or force releasing member 700), in response to the same load.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for deploying an inflatable slide, comprising:
   increasing pressure within the inflatable slide;
   increasing a same load in a force releasing member and a dampener, both of which are attached to the inflatable slide, in response to the increasing pressure within the evacuation slide, the same load being increased at a slower rate than would occur if the dampener were not present;
   separating the force releasing member; and
   inflating the inflatable slide,
   wherein a first strap is coupled to the force releasing member at a first location, a second strap is coupled to the force releasing member at a second location, the dampener is coupled to the force releasing member, and the dampener is coupled in parallel with the second strap.

2. The method according to claim 1, further comprising: stretching, by the dampener, in response to the same load.

3. The method according to claim 1, wherein the force releasing member separates in response to the same load.

4. The method according to claim 1, wherein the force releasing member separates in response to a predetermined pressure.

5. The method according to claim 1, wherein the force releasing member is attached to the inflatable slide at least two locations.

* * * * *